UNITED STATES PATENT OFFICE.

CARL SCHEIBLER, OF BERLIN, GERMANY.

OBTAINING PHOSPHATIC FERTILIZERS FROM BASIC IRON SLAG.

SPECIFICATION forming part of Letters Patent No. 279,445, dated June 12, 1883.

Application filed April 21, 1883. (No specimens.) Patented in England December 7, 1882, No 5,835, and in Luxemburg December 10, 1882, No. 238.

*To all whom it may concern:*

Be it known that I, CARL SCHEIBLER, professor of chemistry, residing in Berlin, Kingdom of Prussia, German Empire, have invented new and useful Improvements in the Method of Utilizing Slags Obtained in the Dephosphorization of Iron, (for which I have obtained patents in Great Britain, December 7, 1882, No. 5,835, and in the Grand Duchy of Luxemburg, December 10, 1882, No. 238, with patent of addition of December 19, 1882, No. 240,) of which the following is a specification.

My invention relates to the utilization of slags obtained in the dephosphorization of iron in the basic-lined converter or in basic-lined open-hearth furnaces; and it consists in improvements in the method of treating such highly-basic phosphoretic slags for the purpose of producing therefrom calcic or magnesic phosphates and oxides of iron and manganese.

Before entering upon a description of the invention, I have to premise that the said slags are mainly constituted of protophosphates of iron and manganese, phosphates and silicates of lime and magnesia, sulphide of calcium and magnesium, and caustic lime and magnesia.

The process which I employ consists, substantially, in a roasting of the powdered slag; in the subsequent treatment of the same by a limited quantity of highly-diluted muriatic acid for the purpose of dissolving phosphates of lime and magnesia, while the oxides of iron and manganese remain undissolved; and, finally, in precipitating the said phosphates from their solution by means of lime or magnesia.

For carrying out the invention the slag is reduced to a fine powder. Particles of iron and steel inclosed in the same should be separated during this operation. The powder is thereupon heated to a red heat, or roasted in oxidizing flame (*i. e.*, in flame containing an excess of air) while being stirred. By this process the lime and magnesia present in caustic state and in certain compounds are caused to decompose the protophosphates of iron and manganese, and to combine with the phosphoric acid of the same to phosphates of lime and magnesia, while protoxides of iron and manganese are set free and converted by the oxidizing action of the air into sesquioxides, or combinations of protoxide and sesquioxide, which are not so easily affected by acids as the protoxides. Besides, the sulphides of lime and magnesia are decomposed, under the influence of the air, into sulphurous acid, which escapes, and caustic lime, which contributes to the decomposition of the phosphates of iron and manganese; also, any sulphide of iron will be decomposed in the same manner. The process may be carried out in a reverberating furnace with inclined hearth, or in revolving furnaces, or other furnaces of suitable construction. The finely-powdered roasted slag is thereupon with advantage freed by washing from the caustic lime which it contains. The milk of lime thus obtained is subsequently utilized in the precipitation of the earth-phosphates from the acid solution. The next step consists in the treatment of the roasted slag by diluted muriatic acid, the quantity whereof should be just sufficient to dissolve all the phosphates and silicates of lime and magnesia, together with the caustic lime and magnesia which are yet present. This quantity is determined by calculation based on chemical analysis of the powder, or experimentally, in treating equal quantities of powder by gradually-increasing quantities of acid, or by continuing to add acid from a determined quantity thereof until iron and manganese commence to be dissolved. In many cases one and one-fourth part, by weight, of the muriatic acid of commerce to one part, by weight, of powdered slag will be a suitable proportion. As regards the degree of dilution, I have to observe that if the slag is treated by muriatic acid but little diluted the silicic acid of the slag will not be completely dissolved. The same will separate out in gelatinous state, and thereby render the separation of the liquid from the undissolved residue so difficult that it cannot be carried out in practice. Besides, though the oxides of iron and manganese have acquired by the roasting the property of being less readily affected by acids than before that process, nevertheless, when acids are used which are but little diluted, the process is likely to take place in too rapid a manner with development of heat, in consequence whereof a considerable quantity of iron will at the beginning be dissolved. By the influence of the lime contained in the slag this iron subsequently separates out again as a gelatinous and bulky precipitate, which impedes in a similar manner as the gelatinous silicic acid the separation of the liquid from the undissolved residue. If, on the other hand, highly-diluted acid is employed, the silicic acid, instead of gelatinizing, will be dissolved, and the solution will contain nearly all the phosphoric acid, whereas the quantity of iron and manganese entering into the same is but insignificant. I therefore add so much water to the acid as to produce a liquid not containing above three and one-half per cent. of anhydrous hydrochloric acid, which corresponds to a specific gravity of 1.0172. This degree of dilution will ordinarily be obtained by mixing one part by volume, of the common muriatic acid of commerce having a strength of 21° Baumé with about nine parts of water. By preference, however, a quantity of water is added sufficient to reduce the titre of the liquid in gaseous hydrochloric acid to 2.1 per cent., which requires about fifteen parts of water to one part of acid of 21° Baumé. Higher degrees of dilution may be applied, but they present the inconvenience that unnecessarily large quantities of water have to be dealt with.

The dissolving process may be carried out in wooden vessels, or in iron tanks lined with lead, or in cemented cisterns of masonry. In order to promote the action of the acid on the powder, the mixture should be agitated by a mechanical stirrer, or by jets of steam or air introduced into the same. The solid residue remaining after the separation of the liquid, and which contains almost all the iron and the larger quantity of the manganese of the slags, together with a small portion of the silicic acid thereof, and with magnesia and lime, may be utilized for the manufacture of iron.

Instead of muriatic acid, other acids may be used in the process; but I do not attach any importance to them, as they are either inconvenient in their application or too expensive for the purpose.

The third operation consists in neutralizing the liquid by caustic lime or magnesia, or by a mixture or combination thereof—such as burnt dolomite—which substances are by preference employed after having been stirred with water to milk of lime, &c. Instead of caustic lime and magnesia, the carbonates thereof might be used; but the former are to be preferred. A precipitate is thereby formed which possesses a different character, according to the particular mode of operating. If lime is added in excess, the precipitate will consist of a mixture of bibasic and tribasic phosphates of lime, &c., together with almost the whole quantity of silicic acid contained in the solution. If the solution is gradually and accurately neutralized, it is substantially the bibasic phosphate which falls to the bottom, with nearly all the silicic acid; but if so much lime only is added as to leave the solution slightly acid the bulk of the silicic acid remains in solution. In all cases, however, the precipitate contains but very little iron or manganese.

Another mode of proceeding, in order to obtain phosphates with but little silicic acid, consists in first treating the powdered and roasted slag by a part only of the acid required for dissolving the phosphates of the same, and subsequently by the remaining part. The solution obtained first will then contain the greater portion of the silicic acid, with a comparatively low amount of phosphates, whereas the second solution comprises the main part of the phosphates, with but little silicic acid. The precipitate obtained is separated from the lye by means of filter-presses or other suitable means, whereupon it is washed and dried. It then forms a tender white powder, especially adapted to be used as manure.

I am aware that heretofore attempts have been made to produce calcic phosphates from phosphatic slags by a process of dissolution in an acid and subsequent precipitation; but these attempts have been unsuccessful, as they were based on the wrong opinion that the peroxides of iron and manganese, and also the silica in the roasted slags, were insoluble in acids; but on account of the too great strength and quantity of the acid employed it was found impossible to avoid dissolving iron and manganese and to prevent more or less of the silicic acid from gelatinizing in the solution. In consideration, however, of such attempts, I do not broadly claim the combination of the roasting, dissolving, and precipitating operations; but

What I claim is—

The treatment of slags obtained in the dephosphorization of iron by the Thomas-Gilchrist process, or of other basic slags having a similar composition, which consists in roasting the powdered slags by oxidizing-flame, in submitting the material thus prepared to the action of muriatic acid, the quantity whereof is so determined as to be sufficient only for dissolving caustic lime and magnesia, together with the silicates and the phosphates thereof, (or whichsoever of these substances are present,) while its dilution is such as is attained by adding at least nine parts of water to one part of the acid of commerce of 21° Baumé, and finally in precipitating phosphate of lime or magnesia, or of both, by addition to the liquor separated from the residue of lime or magnesia, whether caustic or in the state of carbonate, or of a mixture or combination thereof, substantially as and for the purpose specified.

In testimony whereof I have signed my name to this specification in the presence of two subscribing witnesses.

CARL SCHEIBLER.

Witnesses:
HENRY SPRINGMANN,
B. ROI.